United States Patent
Alvarado Solano et al.

(10) Patent No.: US 12,197,920 B2
(45) Date of Patent: Jan. 14, 2025

(54) TEXT BLOCK CLASSIFICATION BY DEPENDENCY TREE GENERATION

(71) Applicant: ACCENTURE GLOBAL SOLUTIONS LIMITED, Dublin (IE)

(72) Inventors: Esteban Alberto Alvarado Solano, San Jose (CR); Paul Edward Nelson, Annapolis, MD (US); Mark David Stanger, Binfield (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 283 days.

(21) Appl. No.: 17/977,120

(22) Filed: Oct. 31, 2022

(65) Prior Publication Data
US 2024/0143334 A1 May 2, 2024

(51) Int. Cl.
*G06F 40/47* (2020.01)
*G06F 9/38* (2018.01)

(52) U.S. Cl.
CPC .......... *G06F 9/3869* (2013.01); *G06F 9/3838* (2013.01); *G06F 40/47* (2020.01)

(58) Field of Classification Search
CPC ....... G06F 9/3869; G06F 9/3838; G06F 40/47
USPC ..................................... 704/2, 8–9
See application file for complete search history.

(56) References Cited

U.S. PATENT DOCUMENTS

2018/0212752 A1* 7/2018 Williams .............. G06F 16/254

\* cited by examiner

*Primary Examiner* — George C Monikang
(74) *Attorney, Agent, or Firm* — Mannava & Kang, P.C.

(57) ABSTRACT

Embodiments of a system and a method for classifying blocks of text at varying, possibly simultaneous, and possibly interacting levels of scope (e.g., sentence, paragraph, section, document) are disclosed. A system includes a processor coupled to: a data reader to receive an input comprising of a data stream, and convert the data stream into one or more logical data blocks of varying scopes. The system includes a dependency tree generator to create a dependency tree to define the scope and dependencies of each of a plurality of natural language processors (NL Processors) with respect to each other such that the dependency tree identifies when an input of a NL Processor (depender) depends on an output of another NL Processor (dependee). Each NL Processor is configured based on a type of at least one logical data block of the one or more logical blocks to which it applies. The system includes a pipeline generator, which automatically generates a pipeline of natural language processors from the dependency tree such that all dependee classifiers are executed and completed on all of their text blocks before all of their depender classifiers.

20 Claims, 15 Drawing Sheets

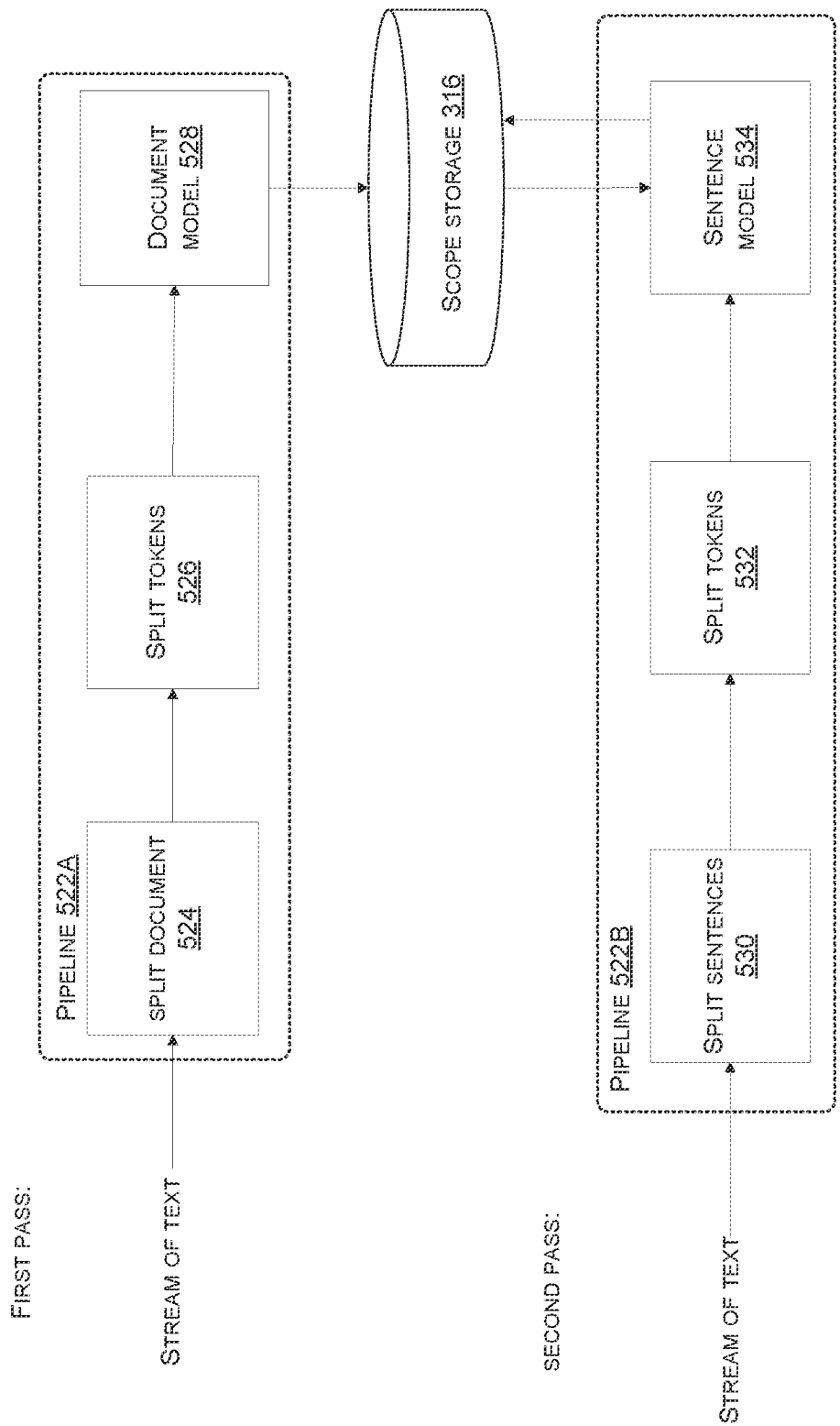

TEXT BLOCK CLASSIFICATION BY DEPENDENCY TREE GENERATION

BACKGROUND

Natural Language Processing (NLP) has traditionally been structured as a series of execution modules arranged in a pipeline, such as tokenization, normalization, and classification. Generally, the pipelines are hard-coded and re-used wherever similar processing is required. With advancements in NLP algorithms, many artificial intelligence (AI) and Machine Learning (ML) models are available to process text input. Each AI or ML model may typically have a targeted purpose. The purpose may include, for example, identifying a risk in a clause of a contract or extracting an employee name from full text. Each such AI or ML model may require an input to be prepared in a certain manner and may have a corresponding pipeline to provide the desired output.

Existing NLP algorithms are applied to blocks of text for the analysis of the text content in a wide variety of ways. The rapid development of the NLP has given rise to problems such as, for example, scalability issues with development, scarcity of memory capacity, complexities with management, and issues with performance. Some applications further require the utilization of multiple NLP models on the same block for text and reprocessing of the same block of text multiple times. These applications can lead to further issues such as excessive utilization of memory capacity, complexity of data management, and decrease in processing speed. Another problem faced by the currently available NLP systems lies in large-scale classification of voluminous text blocks that may not fit into the available memory space. Additionally, the currently available NLP systems may not include defined method for chaining classifiers together, especially when classifiers classify content at different levels of granularity. For example, to classify a sensitivity of an entire document, where the document sensitivity may be based on the classified sensitivity of each sentence, then the currently available NLP systems may not include a method for coordinating the classifiers for accurately classifying the entire document.

Accordingly, there is a need for text block classification techniques that address at least the above-mentioned challenges with the currently available NLP systems.

SUMMARY

Embodiments of a natural language processing system are disclosed. In an embodiment, the system includes a processor, a data reader coupled to the processor, a dependency tree generator coupled to the processor, and a pipeline-based execution engine, coupled to the processor. The data reader is configured to receive an input comprising a data stream and convert the data stream into one or more logical data blocks, possibly at different levels of content granularity (e.g., sentence granularity, paragraph granularity, section granularity, document granularity, and the like). The dependency tree generator is configured to create a dependency tree to define a scope and dependency of each of a plurality of natural language processors (NL Processors) with respect to each other such that the dependency tree identifies when an input of a NL Processor (depender) depends on an output of another NL Processor (dependee), wherein each NL Processor is configured based on a type (e.g., typically the content granularity) of at least one logical data block of the one or more logical blocks to which it applies. The pipeline-based execution engine is configured to generate, from the plurality of NL Processors, a pipeline of a set of NL Processors such that all dependee NL Processors are executed before their depender NL Processors on the logical data blocks and apply the set of NL Processors to the logical data blocks based on the pipeline such that NL processors are applied to the logical data blocks of at least one type to which each NL Processor has been configured. Further, the NL Processors are applied to correctly classify the logical data blocks to which the set of NL Processor are applied, based on content of the logical data blocks and the output from the NL Processor dependees, including situations where the classification of one logical data block depends on the classification output of other logical data blocks.

In an embodiment, the method includes receiving, by a processor, an input comprising of a data stream. Further, the method includes converting, by the processor, the data stream into one or more logical data blocks. Further, the method includes creating, by the processor, a dependency tree to define a scope and dependency of each of a plurality of natural language processors (NL Processors) with respect to each other such that the dependency tree identifies when an input of a NL Processor (depender) depends on an output of another NL Processor (dependee), wherein each NL Processor is configured based on a type (typically the content granularity) of at least one logical data block of the one or more logical blocks to which it applies. Furthermore, the method includes generating, by the processor, from the plurality of NL Processors, a pipeline of a set of NL Processors such that all dependee NL Processors are executed before their depender NL Processors on the logical data blocks. Furthermore, the method includes applying, by the processor, the set of NL Processors to the logical data blocks based on the pipeline such that NL processors are applied to logical data blocks of the type or types to which each NL Processor has been configured. Additionally, the method includes correctly classifying, by the processor, from the plurality of NL Processors, the logical data blocks to which they are applied based on the content of the logical data blocks and the output from the NL Processor dependees, including situations where the classification of one logical data block depends on the classification output of other logical data blocks.

In another embodiment, a non-transitory computer-readable medium is disclosed. The non-transitory computer readable medium includes machine readable instructions that are executable by a processor to receive an input comprising of a data stream. The processor converts the data stream into one or more logical data blocks. Further, the processor creates a dependency tree to define a scope and dependency of each of a plurality of natural language processors (NL Processors) with respect to each other such that the dependency tree identifies when an input of a NL Processor (depender) depends on an output of another NL Processor (dependee) Each of the NL Processor is configured based on a type of at least one logical data block of the one or more logical blocks to which it applies. Additionally, the processor generates, from the plurality of NL Processors, a pipeline of a set of NL Processors such that all dependee NL Processors are executed before their depender NL Processors on the logical data blocks. Further, the processor applies the set of NL Processors to the logical data blocks based on the pipeline such that the set of NL processors are applied to the logical data blocks of at least one type to which each NL Processor has been configured. Furthermore, the processor applies the set of NL Processors to classify the logical data blocks to which the set of NL Processor are applied, based on content of the logical data blocks and the output from the NL Processor dependees.

BRIEF DESCRIPTION OF DRAWINGS

Features of the present disclosure are illustrated by way of examples shown in the following figures. In the following figures, like numerals indicate like elements, in which:

FIG. 5C illustrates a pipeline diagram for a larger classification path to a smaller classification path, according to an example embodiment of the present disclosure.

DETAILED DESCRIPTION

Figure 1:
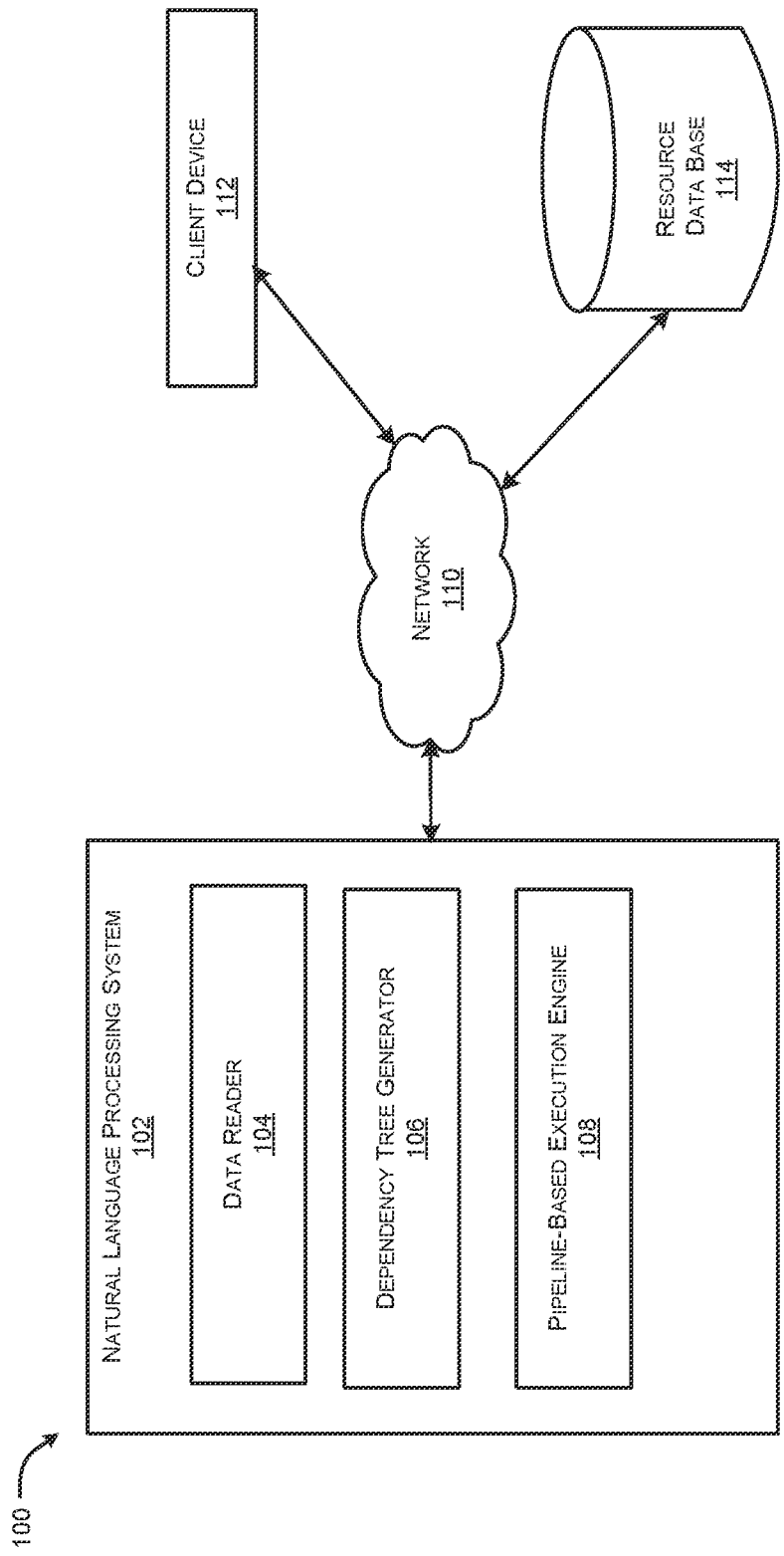
FIG. 1 illustrates a network environment implementing a natural language processing system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "Includes" means includes but not limited to, the term "including" means including but not limited to. The term "based on" means based at least in part on.

In this disclosure, natural language may be understood as a language captured in a document or file, such as a word document or an audio file.

The disclosed embodiments of methods and system combine NLP models of different document scopes (i.e. content granularities) into a pipeline. In the pipeline, the NLP models may depend on the outputs of other NLP models. In an embodiment, the pipeline may include a series of operations, which may be executed in order to perform natural language processing to classify a block of content. For example, the pipeline may include fetching text followed by splitting of sentences, and one or more operations, such as feature extraction and classification. Upon execution of the pipeline, the block of content may be classified. The classified content may be used to route the content for further processing or to tag the content for future analysis or information retrieval.

According to an aspect of the disclosure, the pipeline may be created using operations organized into a graph based on their dependencies. Such a graph may be referred to as a "dependency graph". In the dependency graph, a dependency relationship is represented between a "depender" and a "dependee" when an input of a NL Processor (the depender) depends on an output of another NL Processor (the dependee). The dependency graph may be generated by determining the depender and the dependee and the dependee of the dependee of the operations. Dependencies of the operations may be organized into the dependency graph on the basis of dependency relationships between the operations. In the dependency graph, processing, which may include resources required to provide a necessary input for a natural language operation, such as entity extraction, relationship extraction, and classification to generate the final outputs, may be treated as dependencies. In an embodiment, the dependencies may have further dependencies. Such dependencies of dependencies may be organized into the dependency graph of operations. The operations may be represented as dependents in the dependency graph and the dependency relationships may be represented as links in the dependency graph.

Thus, a dependency graph may be generated based on identified dependents and the further dependents. The dependency graph may include the natural language processing operations, corresponding dependents, and corresponding further dependents arranged in an order of and linked by their dependency relationships.

The present disclosure provides for computing resource efficient, dependable, scalable, and accurate systems and methods for the classification of large text blocks at multiple scopes (i.e., content granularities) by the generation of dependency trees. For example, the present disclosure provides the ability to manage the classification of individual sentences and then proceed to the classification of the whole document. Further, the present disclosure also provides a system and a method that can, in an embodiment, classify individual sentences in a document as well as the entire document in a single pass. Accordingly, there is no need to run the document multiple times in order to classify all the sentences, and then classify the document as a whole. Instead, the disclosed system and methods can classify the different granularities in the document as well as the entire document in a single pass. This saves time associated with reloading the document multiple times. A key aspect of the invention is that the classification of the document can further depend upon the classifications of the individual sentences. That is, the document classifier may take, as input, the outputs of the individual sentence classifiers.

The present disclosure also provides a user configurable feature that provides flexibility to the proposed solution. For example, the user may (provide an input to) decide upon the dependers and the dependees of the dependency graph on the basis of the context of the document and the objectives of classification of the document. In an embodiment, the steps of selecting the dependers and the dependees of the dependency graph may be automated or may be specified by pre-tested and pre-trained classifiers.

When a new user tries to generate a dependency tree or graph with a new content, the new user may select the pre-built classifiers for the generation of the dependency tree. For example, if a user needs to understand the sensitivity of a document, the user may select the pre-built classifier that may have a preset dependency tree or dependency requirements.

The disclosed embodiments of the system provide efficient, comprehensive, dependable, automatically optimized and accurate classification of natural language input. Additionally, natural language-based inputs, which otherwise would not have been appropriately classified may now be processed in an accurate manner without substantially increasing computational complexity and computation time. Therefore, the disclosed subject matter provides efficient, accurate, and reliable classification of the context of natural language.

FIG. 1 illustrates a network environment 100 implementing a natural language processing system 102 (hereinafter referred to as the system 102), according to an example embodiment of the present disclosure. In an example embodiment, the system 102 processes a natural language, which a user uses to interact with the system 102, in order to understand a context of the natural language input. The "natural language" input used herein, refers to a human interpretable language such as, but is not limited to, English, Chinese, Russian, German, French, Japanese, and the like, as opposed to a machine language. The natural language may be a written language or a spoken language. The description hereinafter refers to the English language for the purpose of explanation and simplicity of disclosed embodiments. The choice of natural language should not be construed as a limitation. One of ordinary skill in the art will appreciate that any natural language may be processed by the system 102 without departing from the ongoing description.

In an example embodiment, the network environment 100 may be a public network environment, including thousands of individual computers, laptops, various servers, such as blade servers, and other computing devices. In another example embodiment, the network environment 100 may be a private network environment with a limited number of computing devices, such as individual computers, servers, and laptops. Furthermore, the system 102 may be implemented in a variety of computing systems, such as, but is not limited to, a laptop, a desktop, a tablet, and the like.

According to an example embodiment, the system 102 may be communicatively coupled with a client device 112 through a network 110, such that the user of the client device 112 can interact with the system 102. Although, it is shown that the client device 112 is communicatively coupled with the system 102 through the network 110, the client device 112 may be communicatively coupled with the system 102 through one or more communication links, other than the network 110.

In an example embodiment, the network 110 may be a wireless network, a wired network, or a combination thereof. The network 110 may also be an individual network or a collection of many such individual networks, interconnected with each other and functioning as a single large network, e.g., the Internet or an intranet. The network 110 may be implemented as one of the different types of networks, such as the intranet, a local area network (LAN), a wide area network (WAN), a mobile network, the internet, and the like. Further, the network 110 may include a variety of network devices, including, but are not limited to, routers, bridges, servers, computing devices, storage devices, and the like.

Further, the system 102 may be further communicatively coupled to a resource database 114 through the network 110. In an embodiment, the resource database 114 may contain any resource required by the system 102. The resource in the resource database 114 may include indexed, but are not limited to, databases, patterns, dictionaries, thesauri, word embeddings, machine learning models, and the like. In an example, the resource database 114 may implement any appropriate database, index or storage technology. In an example implementation, resources are stored in files and in a search engine.

Further, the resource database 114 may be accessed by the system 102 for natural language processing. Furthermore, the resource database 114 may be periodically updated. For example, new data may be added into the resource database 114 or existing data in the resource database 114 may be modified, or redundant data may be deleted from the resource database 114.

Additionally, the system 102 may be coupled to a document database (not shown in figures). In an embodiment, the document database may provide natural language content to the system 102. The natural language content may be used by the system 102 for training data, testing data, or to provide natural language input for the client device. In an embodiment, training data and testing data may be required by system 102 to implement automated retraining and retesting as natural language operations are modified.

According to an example embodiment, the system 102 may include a data reader 104, a dependency tree generator 106, and a pipeline-based execution engine 108. In an example embodiment, the data reader 104, the dependency tree generator 106, and the pipeline-based execution engine 108 may be in communication with each other. Further, the data reader 104, the dependency tree generator 106, and the pipeline-based execution engine 108 may be executed in an orderly manner (i.e., in a pipeline) or in parallel, or in a random manner.

In an example embodiment, the system 102 may execute the data reader 104 to receive an input from the user or the client device 112. In an example, the input may be original document content, where a logical data block comprises, metadata associated with the original document content. The metadata may be indicative of at least one of the locations of the one or more logical data blocks in the original document content. In an embodiment, the input may be flags indicative of a start or an end of any or a combination of the logical data blocks. In an embodiment, the input may also be references to shared metadata for the logical data blocks. The references to shared metadata may include, but are not limited to, a source of the data, security rights, time stamps, and the like. In an embodiment, the input may be a data stream and may comprise raw text indicative of a natural language.

Further, the one or more logical data blocks are sent to a set of NL Processors in an order in which the logical data blocks occurred in the original document content. The NL processor may be any of a classifier, a processor, or a recognizer, and the like. The plurality of NL processors includes, but not limited to, document level NL processors, paragraph level NL processors, page level NL processors, section level NL processors, token level NL processors, character level NL processors, sentence level NL processors, and the like. Further, the one or more logical data blocks sent to the NL processors are flagged to indicate when a smaller data block represents a start or a finish (or both) of a larger data block which is used by the set of NL processors to determine a start of content and an end of content which is being classified. Furthermore, the NL processors perform processing of at least one of the original document content and the metadata to create new metadata.

In an example embodiment, upon receiving the data stream, the system 102 may execute the data reader 104 to read data from the data stream and convert the data stream into one or more logical data blocks. Each logical data block may represent logical divisions of content from the data stream. The logical data block comprises, but not limited to, a whole document, a document section, a document paragraph, a document sentence, and the like.

In addition, upon converting the data stream into one or more logical data blocks, the system 102 may execute the dependency tree generator 106 to create a dependency tree. The dependency tree may define a scope and dependency of each of a plurality of natural language processors (NL Processors) with respect to each other. The dependency tree identifies the dependencies of the input NL Processors (dependers) on the outputs of other NL Processors (dependees). In an embodiment, each NL Processor is configured based on a type of the one or more logical blocks to which it applies. For example, the type of the one or more logical blocks may include, but is not limited to, a granularity or scope, e.g., sentence granularity, paragraph granularity, section granularity, or document granularity, and the like. In an embodiment, the dependency tree may be an acyclic directed graph. Furthermore, the dependency tree may be hierarchical such that a first depender NL Processor at a higher granularity depends upon classifications provided by a lower granularity second dependee NL Processor to classify the higher-granularity logical data blocks. In an example embodiment, the higher-granularity logical data blocks encapsulate more content (e.g., documents, sections, and the like) when compared to lower-granularity logical data blocks (e.g., paragraphs, sentences, and the like). The logical data blocks may overlap. In an example embodiment, "sentence level" logical data blocks can represent sentences found within higher-granularity, section, and document logical data blocks.

In an example embodiment, the system 102 may execute the pipeline-based execution engine 108 to generate, from the plurality of NL Processors, a pipeline of a set of NL Processors such that all dependee NL Processors are executed before their depender NL Processors on the logical data blocks according to the dependency tree.

In an example embodiment, the system 102 may execute the pipeline-based execution engine 108 to apply the set of NL Processors to the logical data blocks based on the pipeline such that the set of NL processors are applied to the logical data blocks of at least one type to which each NL Processor has been configured.

In an example embodiment, the system 102 may execute the pipeline-based execution engine 108 to apply the set of NL Processors to classify the logical data blocks to which the set of NL Processor are applied, based on content of the logical data blocks and the output from the NL Processor dependees.

Figure 2:
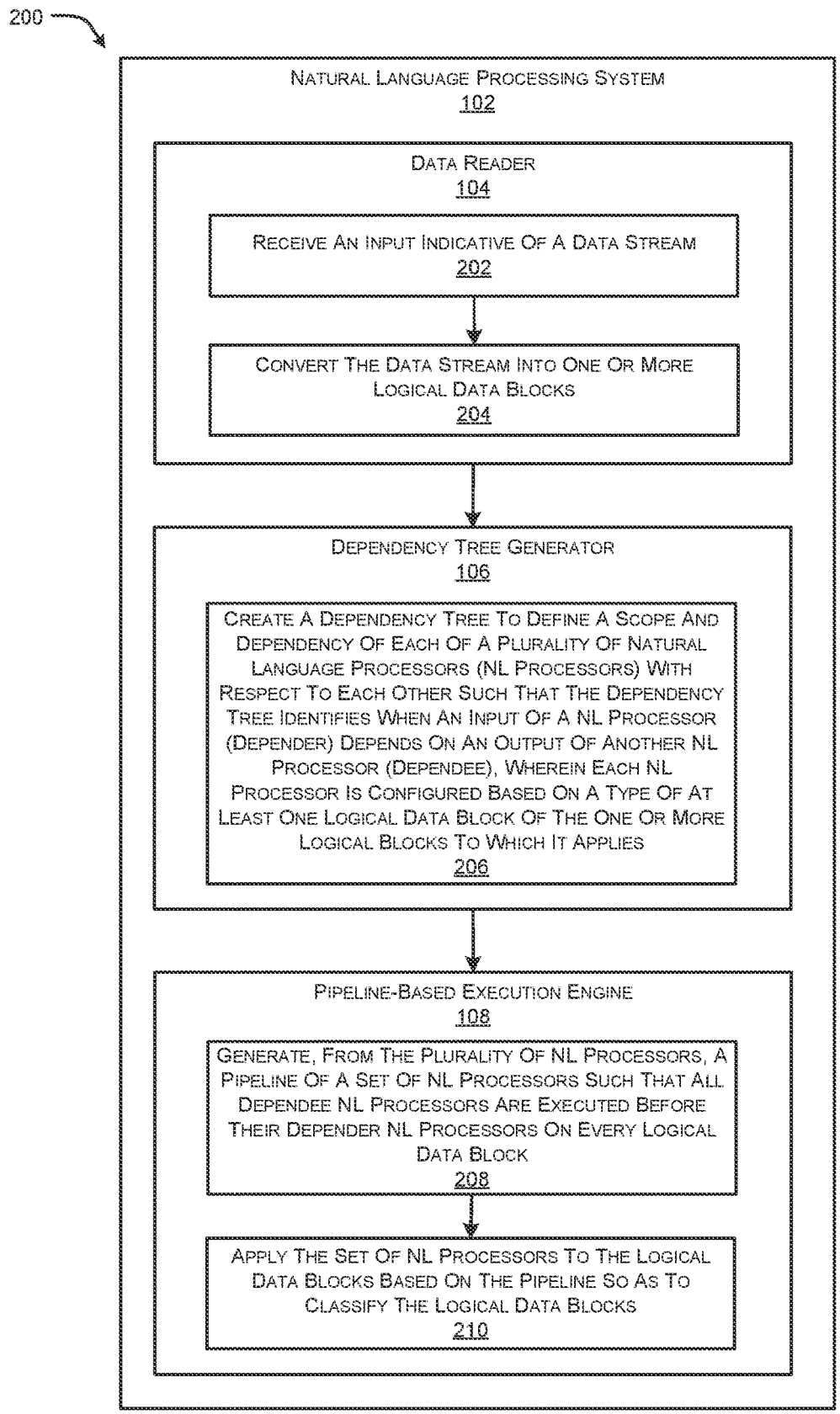
FIG. 2 illustrates a block diagram of a natural language processing system, according to an example embodiment of the present disclosure.

FIG. 2 illustrates a block diagram 200 of the system 102, according to an example embodiment of the present disclosure.

In an example embodiment, the data reader 104 may receive an input comprising a data stream 202 and convert the data stream 202 into one or more logical data blocks 204. A user may provide the input to the data reader 104 through input devices such as a keyboard, a microphone, and a pointing device, for example, a mouse or a touchpad. Upon receiving the data stream, the data reader 104 may read data from the data stream and convert the data stream into a logical data block. Once the data is converted into one or more data blocks, the dependency tree generator 106 of the system 102 creates a dependency tree to define a scope and dependency of each of a plurality of natural language processors (NL Processors) with respect to each other.

In an example embodiment, the dependency tree is created from a static configuration file and is the same regardless of the output of the Data Reader 104. In other embodiments, the dependency tree may be dynamically created based on the output of Data Reader 104. Next, the pipeline-based execution engine 108 generates a pipeline of a set of NL Processors from the NL Processors. In the pipeline, all dependee NL Processors are executed before their depender NL Processors on the logical data blocks 208 blocks, according to the dependency tree. Next, the pipeline-based execution engine 108 applies the NL Processors to the logical data blocks such that the set of NL processors are applied to the logical data blocks of at least one type to which each NL Processor has been configured. Further, the pipeline-based execution engine 108 applies the NL Processors to classify the logical data blocks 210 to which the set of NL Processor are applied, based on content of the logical data blocks and the output from the NL Processor dependees.

Figure 3A:
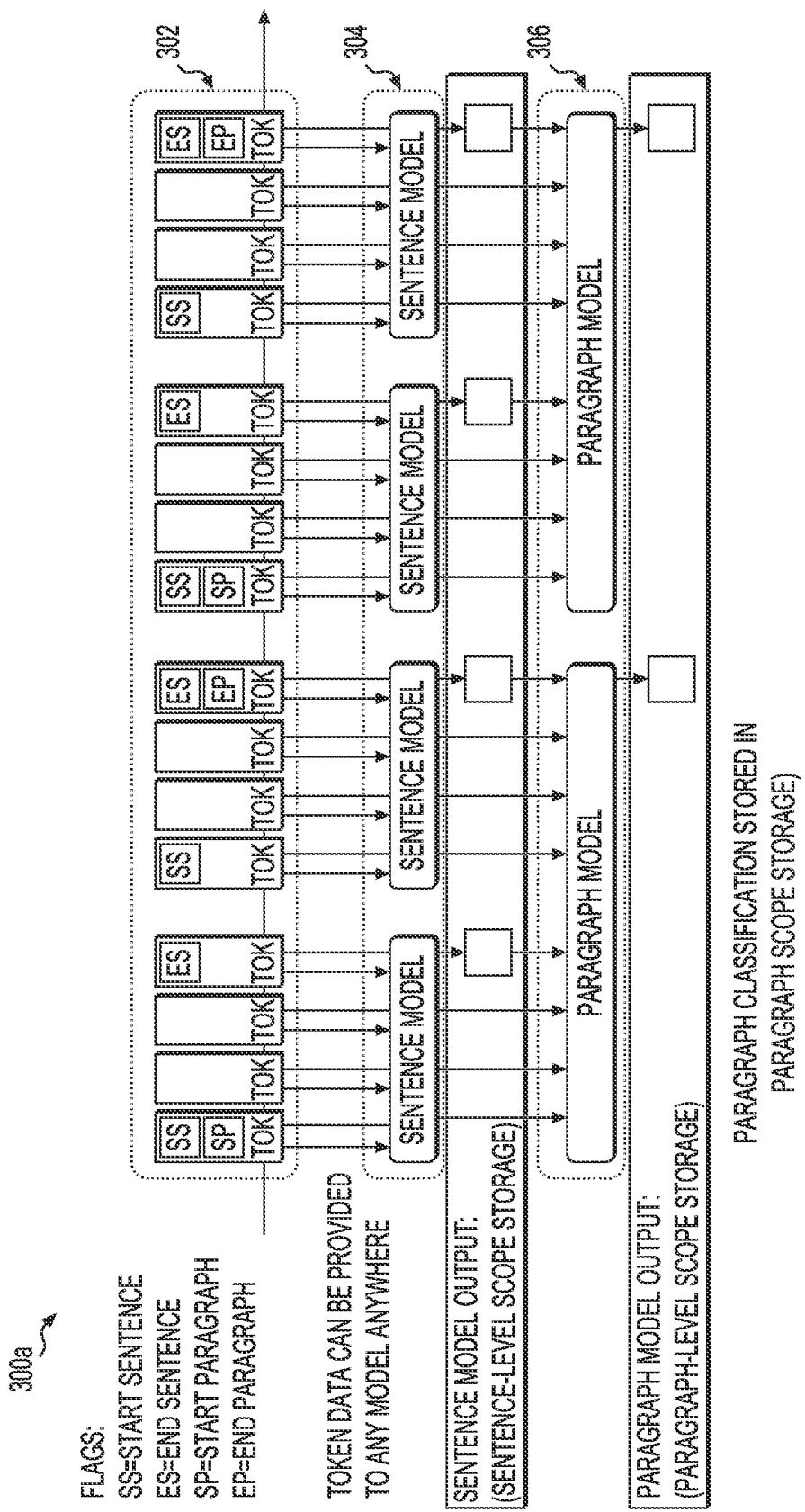
FIGS. 3A, 3B, and 3C illustrate execution flow methods leveraging a dependency tree of the system when an input to a larger-scope (i.e., larger granularity) classifier depends upon outputs of other classifiers of smaller scope (i.e., smaller granularity) classifier, according to an example embodiment of the present disclosure.
Figure 3B:
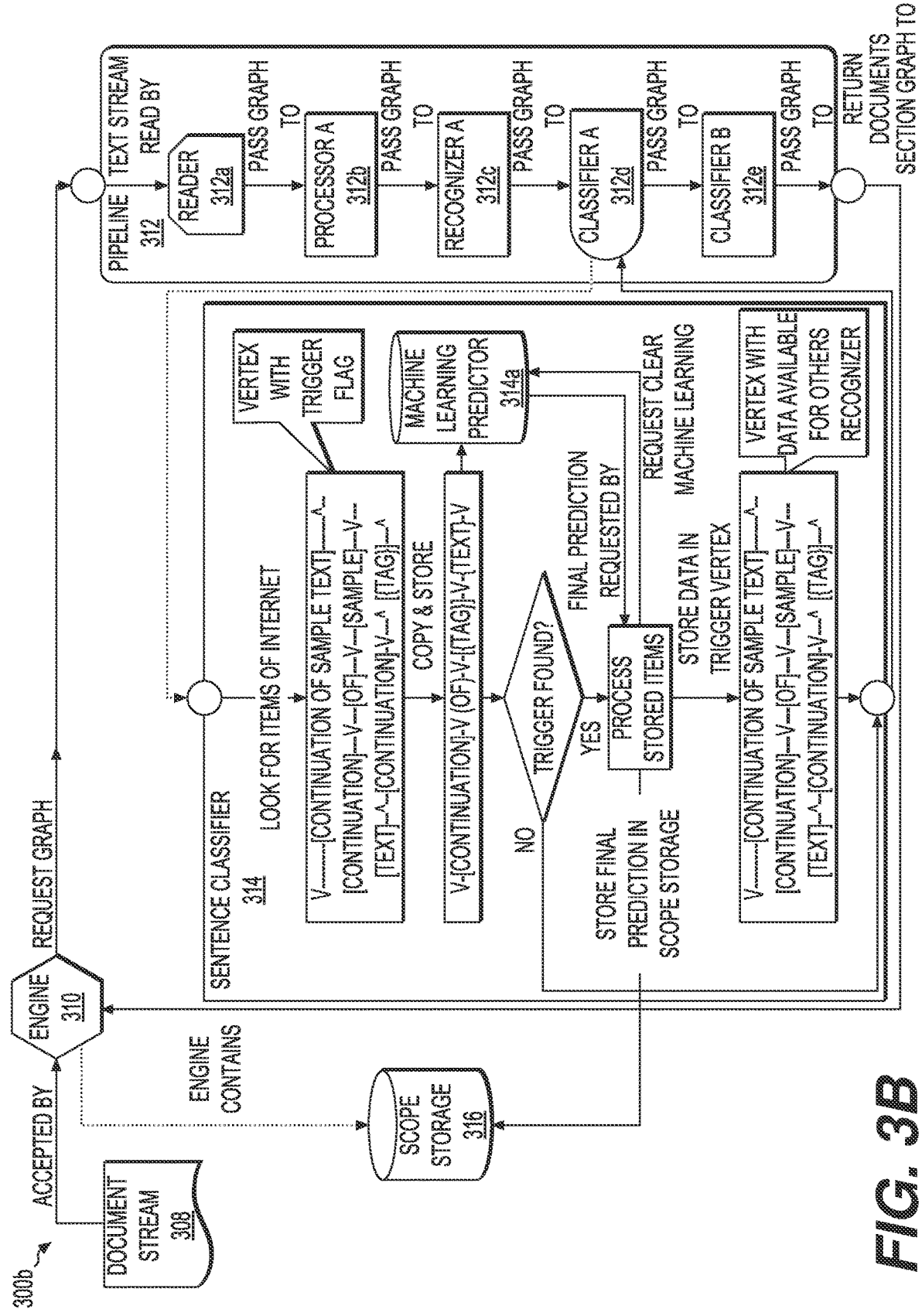

FIGS. 3A, 3B, and 30 illustrate execution flow methods 300a, 300b and 300c, respectively, leveraging a dependency tree of the system 102 when all NLP processors depend upon the outputs of lower granularity NLP processors (in other words, NLP processors which cover a smaller scope of input content), according to an example embodiment of the present disclosure. Referring to FIG. 3A, as depicted a sentence model 304 may receive an input from tokens 302 and generate a classification for every sentence which may be stored in a sentence-level scope storage (as shown in FIG. 3A). Subsequently, a paragraph model 306 may receive an input both from the tokens 302 and the classification of the sentence model 304. As the tokens 302 are processed, a start sentence flag and an end sentence flag may define the beginning and ending of a sentence. For the sentence, a machine learning predictor may be created, and the tokens 302 may be ingested. An intermediate output for sentence classification may be stored in the sentence model 304 as the tokens 302 are processed. Once the processing of the sentence is complete, a prediction may be made, and an output may be stored in a sentence-scope storage and made available to the paragraph model 306.

In an example implementation, the FIG. 3A depicts that the paragraph model 306 may receive the token 302 and use the token 302 for the paragraph model classifier. However, the paragraph model 306 may also depend on the output of the sentence model 304. As a result of this dependency, the paragraph model 306 may always be executed after the sentence model 304. This may ensure that every sentence processing may be completed (and the sentence-level scope storage may store the sentence model output) before the paragraph model is executed. Thus, the paragraph model 306 may depend upon the sentence output being completed when it receives the end sentence flag for each sentence that it receives in as input. This would still be the case with parallel processing where the last sentence in the document is not the last to finish processing.

The sentence model 304 may be needed for processing the tokens 302 that belong to the sentence. Once the processing of the sentence is completed, the prediction may be made, the output may be stored into scope storage and the sentence model 304 may be released. In a similar fashion, the paragraph model 306 may be released after the processing is completed.

As illustrated in FIG. 3B, a document stream 308 may be received by an engine 310, which sends the content to a pipeline 312 that has been previously built from the dependency graph. In the pipeline 312, a reader 312a may read a text stream and then may split the text stream into the one or more logical data blocks (such as sections, paragraphs, sentences, tokens, and the like). The one or more logical data blocks may be passed down the pipeline 312, first to a processor A 312b. The Processor A 312b may perform add, split, tagging or transform operations, and the like, on the input data blocks. From the Processor A 312b, the logical data blocks may be sent to a recognizer A 312c. In the recognizer A 312c, the logical data blocks may be analyzed to tag the logical data blocks using natural language processors based on, but not limited to, dictionary, patterns, machine learning models, and the like.

Next, the logical data blocks may be passed to a classifier A 312d from the recognizer A 312c. In an exemplary embodiment, the classifier A 312d provides a detail of the inner workings of a sentence classifier 314. The sentence classifier 314 may extract elements of interest from the logical data blocks and may hold intermediate, in-progress data for internal computations in the machine learning predictor 314a. Note that in the diagram, the sentence classifier 314 shows "vertices" (the letter 'V' or 'v' or the caret A). These are junction points" between logical data blocks, which are used to attach data and flags appropriate to mark the beginning and ends of logical data blocks. In the sentence classifier 314, if a vertex with the appropriate (configured based on the level of logical data block, in this diagram, the "sentence level" since it is a sentence classifier) trigger flag is detected indicating the end of the logical data block of interest, then one or more of the following three steps may be performed: 1) a final prediction may be requested from the machine learning predictor 314a, 2) the final prediction may be stored in a scope storage 316 so that it may be available both to other pipeline processors later in the pipeline (e.g. after pipeline stage 312d) as well as to other systems which may come after system 102, and 3) the final prediction may be stored in the vertex itself, again for use by other, later stage pipeline processors after stage 312d. However, if the vertex with the appropriate trigger flag is not detected in the elements of interest, then none of the three steps may occur. Instead, processing continues to later stages (after 312d, such as a classifier B 312e) after which more logical data blocks output from the reader 312a may be processed, until the vertex with the trigger flag is finally found and the final sentence prediction can be made.

The scope storage 316 may be implemented outside the pipeline 312 and may exist for the duration of the pipeline 312 and beyond. The scope storage 316 may hold the output of the models for all scopes and may become a final output from the system 102 to be used for down-stream processing by later systems. Further, the scope storage 316 may hold only the final output from the classifier A 312d for each processed sentence. In an embodiment, the scope storage 316 may not hold any "in progress" data such as dictionaries and Neural Networks. Therefore, the system 102 may be more memory-efficient than existing systems. Further, when the classifier A 312d only requires inputs from lexical items of smaller scope (e.g., lower levels of logical data blocks, for sentences, this would typically mean tokens and characters), the entire document may be processed in a single pass for all the classifiers thereby making the system 102 more efficient in terms of a time consumption, a memory, an Input/Output (I/O) bandwidth, and Central Processing Unit (CPU) cycles.

Figure 3C:
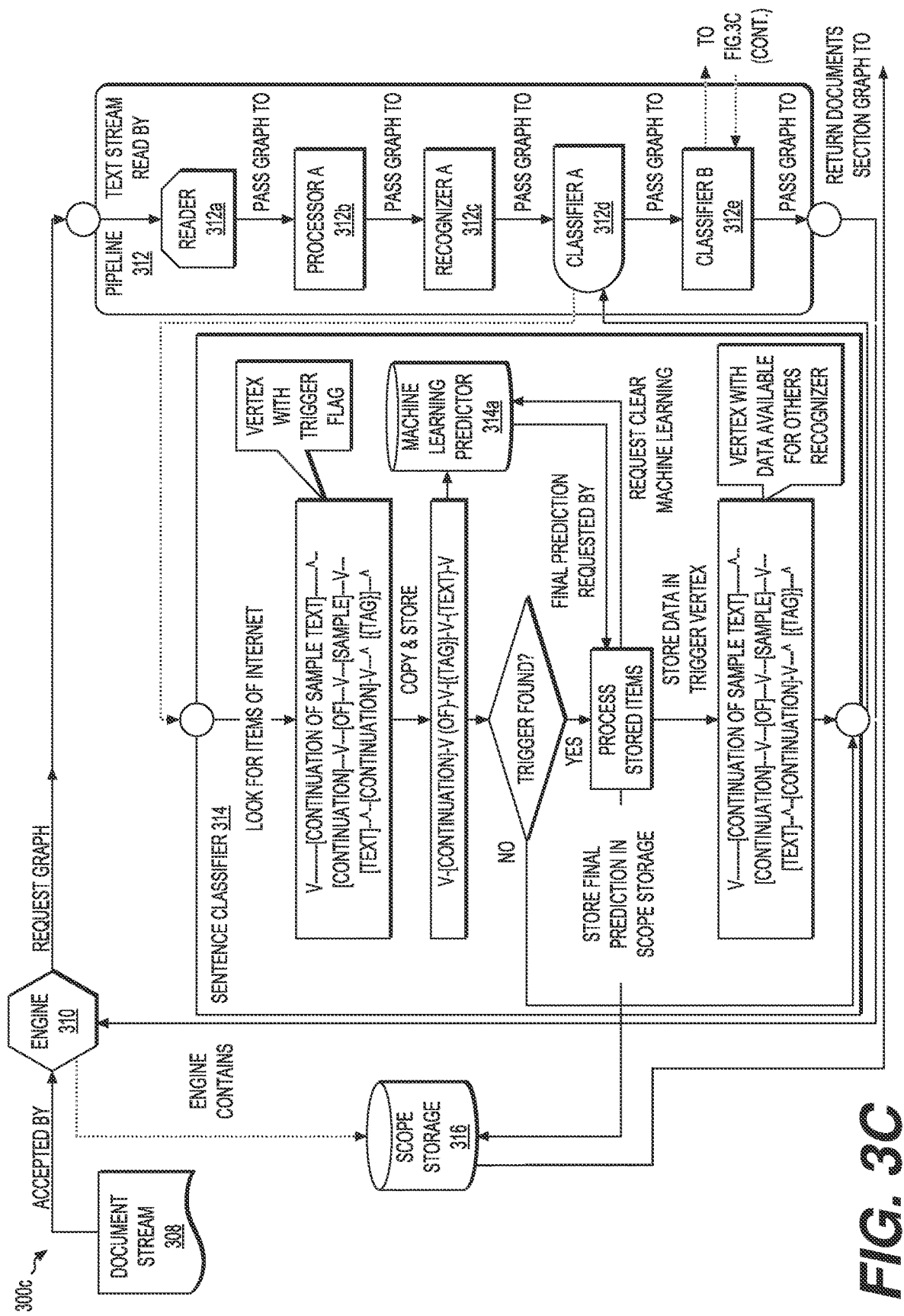
Figure 3C:
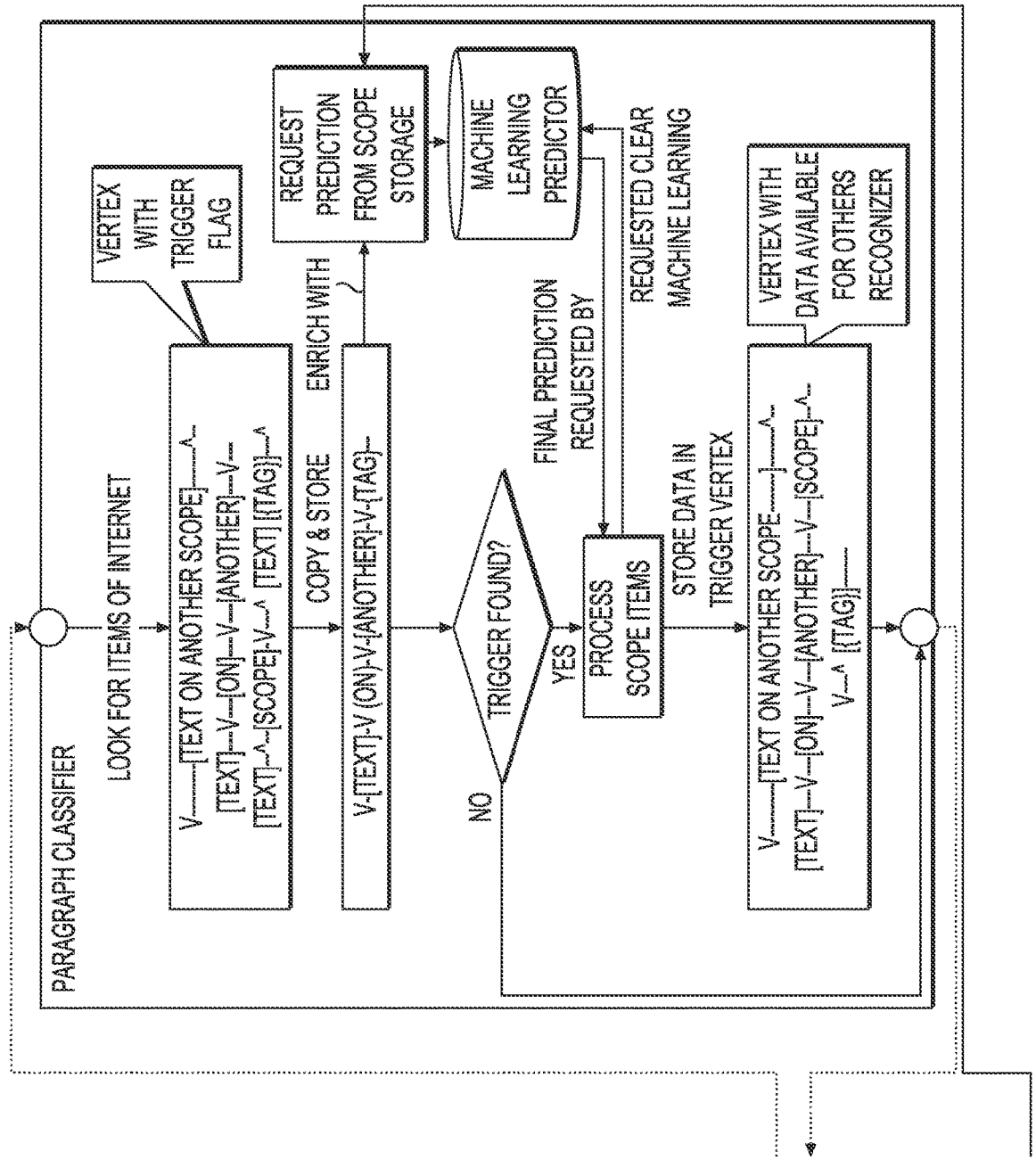

As illustrated in FIG. 3C, if all classifiers only have inputs from lexical items of a smaller scope than that of their dependers, then an entire document may be processed in a single pass for all the classifiers. In FIG. 3C, this is shown by the placement of a classifier B 312e, which may be a paragraph classifier, which takes as respective inputs the outputs of a classifier A 312d, the sentence classifier 314. Because the classifier B 312e is of higher level (paragraph) than its dependee (classifier A, the sentence level) it will be placed after the classifier A 312d in the pipeline 312, and the entire document can be processed through both classifiers in a single pass. In FIG. 3C, as each sentence is classified by the classifier A 312d, the final classification output for each sentence is stored in the scope storage 316. Each sentence is then processed by the classifier B 312e which fetches the just completed classification output of the sentence from scope storage 316 and then inputs that classification into a paragraph classification model of the classifier B 312e. Once all of the sentences (and tokens) for a paragraph are complete, the classification of the paragraph is then completed by the classifier B 312e which then stores the classification for the paragraph into the scope storage 316 to potentially be used by further classifiers of even higher levels (e.g., section or document classifiers) as well as being available for further downstream systems after the system 102.

Figure 4:
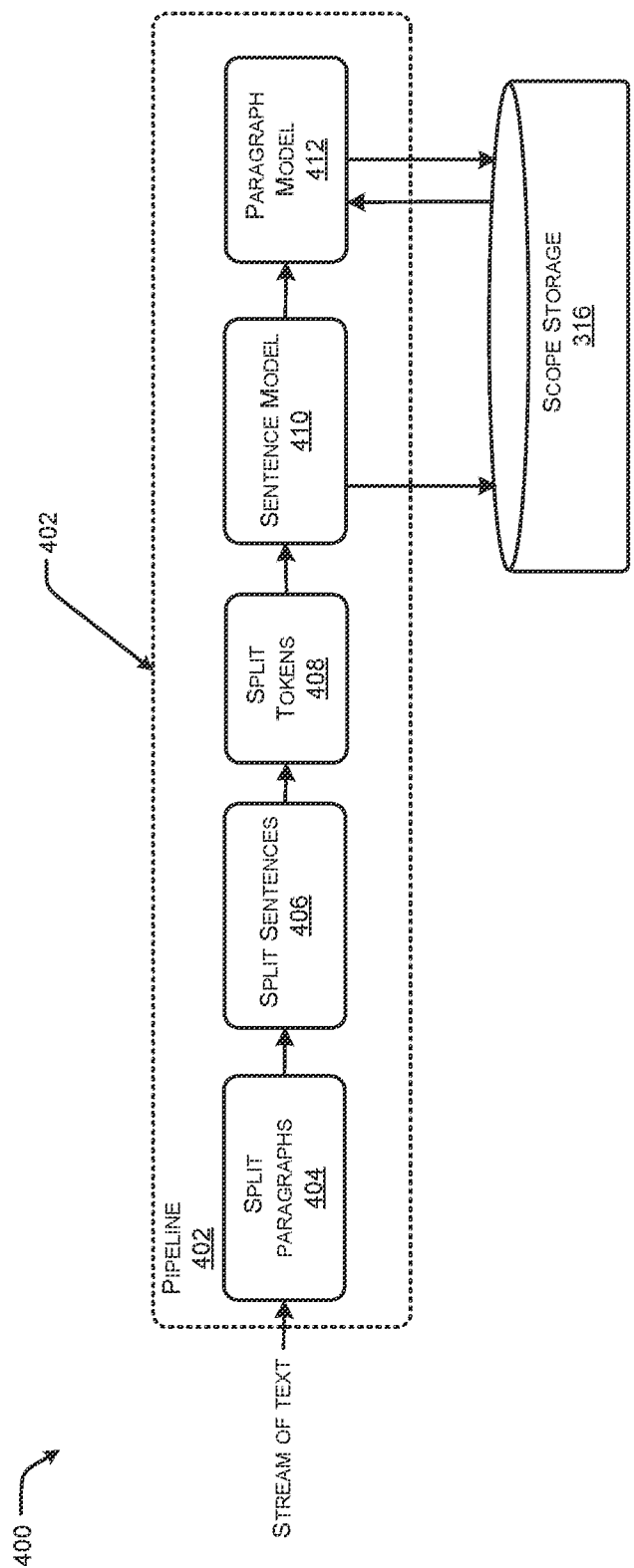
FIG. 4 illustrates a pipeline diagram generated from a dependency graph of the system, according to an example embodiment of the present disclosure.

FIG. 4 illustrates a pipeline diagram generated from a dependency graph of the system 102, according to an example embodiment of the present disclosure. FIG. 4 may illustrate a higher-level representation of the pipeline 312 shown in FIG. 3C. In an example embodiment, a pipeline 402 may be built automatically on the basis of the dependency graph (or tree). A stream of text may be received at a split paragraphs module 404. The split paragraphs module 404 may flag a beginning of a paragraph with a start paragraph flag and may flag an end of the paragraph with the end paragraph flag. The beginning and the end of the paragraph may be propagated automatically to the NLP processors which splits paragraphs into lexical items of a smaller scope, such as a split sentences module 406.

The split sentences module 406 may flag a beginning of a sentence with a start sentence flag and flag an end of the sentence with the end sentence flag. This may be propagated, automatically, to lexical items of smaller scope in a split tokens module 408, which may then split each sentence into the tokens, flagging a first token as a first token of its associated sentence and a last token within the sentence as a last token in the sentence. A sentence classification model 410 (also referred to hereinafter as a sentence model 410) may be initialized whenever it may receive a token with a start sentence flag. The sentence model 410 may process each token as it comes (e.g., by feeding it to a neural network or by accumulating a "bag of words" structure which may be stored in memory—for example in the machine learning predictor 314a from FIG. 3B or 3C). The sentence model 410 may complete processing for a sentence when it may receive a token with the end sentence flag. The sentence model 410 may run a final prediction and may store the final prediction output in the scope storage that may be an independent data structure that persists outside of the pipeline 402.

In an example embodiment the sentence model 410 may release memory space required to process the sentence model 410 after the final prediction for each sentence it processes. The paragraph model 412 may be initialized whenever it may receive a token with the start paragraph flag and may process each token as it comes. Further, the paragraph model 412 may process each sentence when it may receive the end sentence flag. Further the paragraph model 412 may take, as input, the classification output from the sentence model 410 for each sentence, which it can retrieve from the scope storage 316. The paragraph model 412 can depend on the sentence classification for each sentence to be fully completed and written to the scope storage 316, because the paragraph model 412 is placed after the sentence model 410 in the pipeline 402, according to the dependency graph, where the paragraph model 412 depends on the sentence model 410. Further, the paragraph model 412 may complete processing for the paragraph when it may receive a token with the end paragraph flag.

Further, the paragraph model 412 may run a final prediction and may store a prediction output in the scope storage 316. Further, the paragraph model 412 may release all memory to process the paragraph model 412 after the final prediction. In an example embodiment, the scope storage 316 may be implemented outside the pipeline 402 and may persist for the duration of the pipeline 402 and beyond. The scope storage 316 may hold the output of all of the models for all scopes and becomes the final output from the system 102 to be used for the down-stream processing.

Figure 5A:
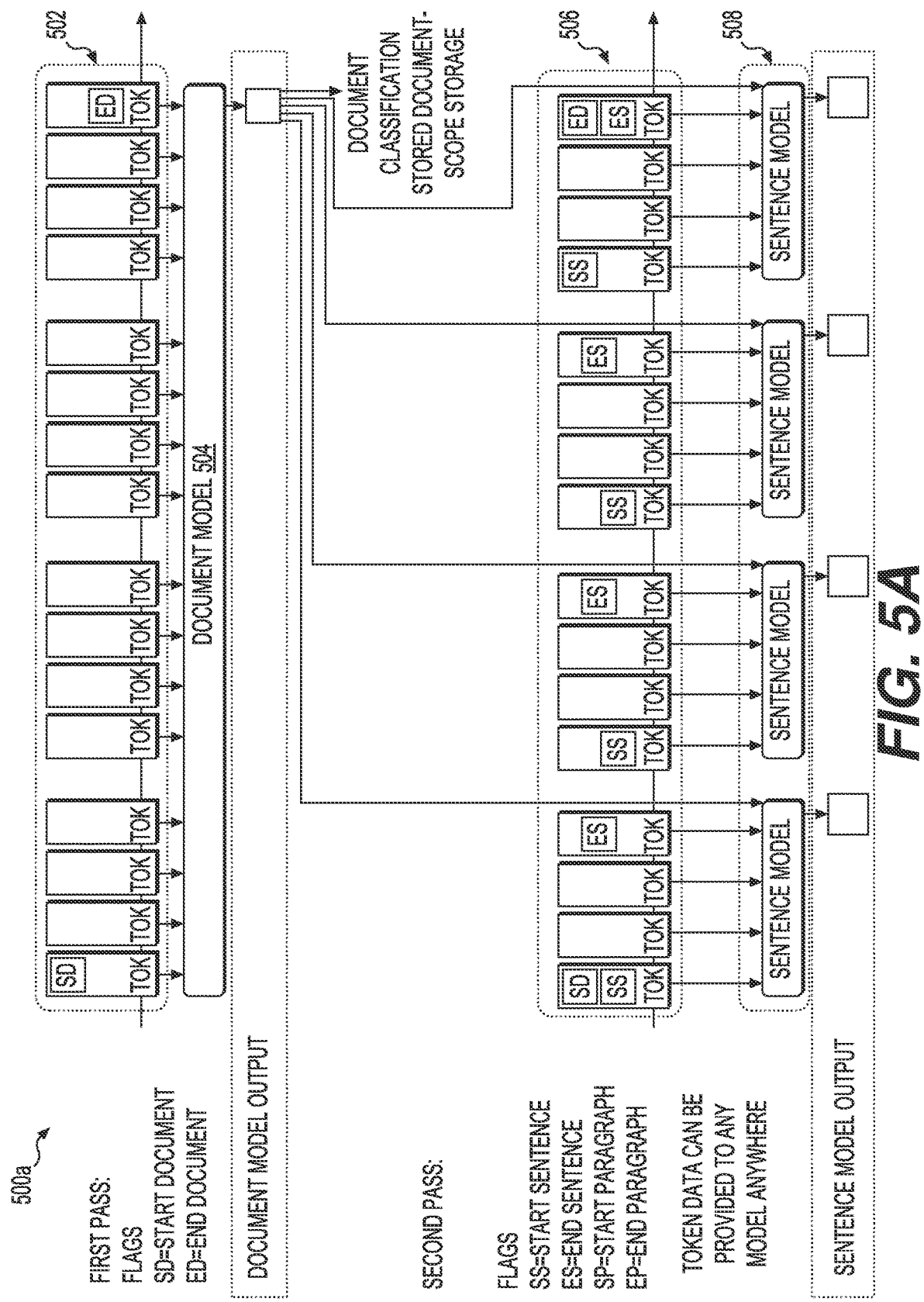
FIGS. 5A and 5B illustrate execution flow methods leveraging a dependency tree of the system when an input to a classifier of smaller scope (i.e., granularity) classifier depends upon the output from a larger scope classifier, according to an example embodiment of the present disclosure.
Figure 5B:
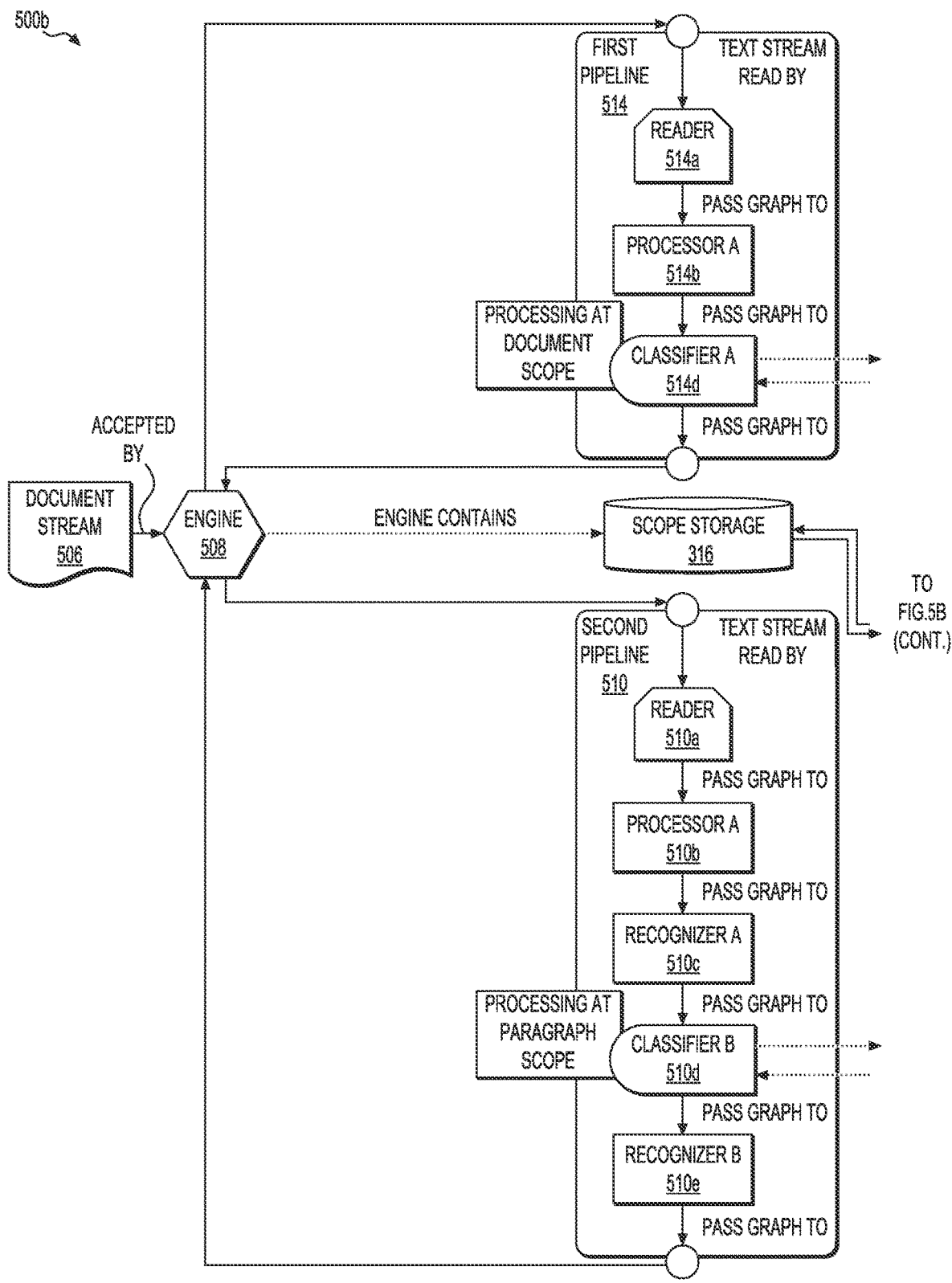

FIGS. 5A and 5B illustrate execution flow methods 500a and 500b, respectively, leveraging a dependency tree of the system 102 when a classification model or the NLP processor of smaller scope, for example a sentence classifier, depends upon the output of a classification model or the NLP processor of a larger scope, for example a document model, according to an example embodiment of the present disclosure. As illustrated in FIG. 5A, in an example embodiment, a model which may have a larger scope is a dependee that may provide an input to a model with a smaller scope. A sentence classifier (not shown in FIG. 5A) may change its classification output based on the classification of a document as a whole. By way of example, if a document is a merger contract, a classifier for a "risky sentence" in the contract may be different than if the document is an employment agreement. Therefore, the sentence classifier may require, as input, the entire document classification before it may determine a level of risk of a sentence.

As illustrated in FIG. 5A, a first pass may be used to determine the full document classification, and then a second pass may be used to determine each sentence classification. In an embodiment, there may be separate pipelines for each pass. The scope storage 316 (shown in FIGS. 3B and 3C) may exist as an independent data structure which may hold an output of the first pass and may make it available as an input to the second pass. All dependencies between the NLP processors may be captured in a dependency graph (not shown). Therefore, the system 102 may automatically determine, by inspecting the dependency graph and various scopes of operations, a required number of passes through the document. Further, the system 102 may automatically optimize the various pipelines to minimize the number of passes by combining as many operations together as possible into the smallest possible number of pipelines.

In an example embodiment, this may be achieved by first packing as many operations as possible into a first pipeline, such that all dependee operations occur before their depender operations, and operations may be sorted by level, from smallest (e.g. lexical items which cover the smallest amount of content, such as tokens and sentences) to largest (e.g. sections or documents), leaving out any depender which depends upon a dependee that is of a larger scope, for example, a sentence classifier which depends upon the output of a document classifier. This packing procedure is then performed for a second pipeline with all of the NLP operations which were "left out" of the first procedure, and then can continue to third and fourth pipelines, as needed until all operations have been assigned to a pipeline. The resulting number of pipelines may determine the minimum number of passes through the content that may be required to perform all of the necessary classifications. It may be noted that an optimized, multi-pass approach to classification may provide multiple technical advantages over current approaches.

For example, the multi-pass approach provides for better accuracy, allowing the document's overall classification to provide context which allows lower-level classifiers, such as sentence and paragraph classifiers to be more accurate. Another advantage provided by the multi-pass approach is better performance, where the lower-level classifiers can be optimized for performance based on the full document context, for example, to turn-off parts of the sentence classifier which are not needed based on what type of document is being processed.

In an example embodiment, the first pass may contain all of the stages upon which a document model 504 depends, and the second pass may contain all of the stages upon which a sentence model 508 depends as well as stages that produce further output not required by either the document model 504 or the sentence model 508.

An alternative approach may include saving intermediate sentence models until document-level model classification may be completed. The system 102 may then go back and may finalize all stored models once full document classification is known. In an embodiment, the sentence model 508 may be split into two parts. A first part that may process just the tokens and produce an intermediate output that may be stored in the scope storage 316. A second part that may receive the document classification and all the intermediate outputs from the scope storage 316 for all sentences and then may make the final determiner for all sentences. In an example, it may be possible to run two sentence models to produce two classifications for every sentence. The two classifications for every sentence may include a risk classification if a document is an employment application, and a risk classification if a document is a merger agreement. These two classifications would be the intermediate output, it can be either one or the other, but the final determination requires the document classification. Both predictions may be stored in a sentence-scope storage as intermediate output. Then, once the document type may be determined, a second algorithm may then go through all the sentences stored in the scope storage 316 and may make a final determination of risk for all the sentences by choosing from one or the other of the classifications stored in intermediate output for all sentences.

As illustrated in FIG. 5B, a document stream 506 may be accepted by an engine 508. The engine 508 may build a first pipeline 514 automatically based on a dependency graph (not shown). In the first pipeline 514, a reader 514a may read a text stream and then may split the text stream into tokens. The tokens may pass from the reader 514a to a processor A 514b. The processor A 514b adds, splits, or transforms the tokens. From the processor A 514b, the stream of tokens may be passed to a classifier A 514d. The classifier A 514d may contain a document classifier 518.

The document classifier 518 may extract elements of interest and may create a copy for internal ingestion into a machine learning predictor 518a. In the document classifier

518, if a vertex with trigger flag (for the end of the document) is detected in the extracted elements of interest, then, a final prediction may be requested from the machine learning predictor 518a and then stored in the scope storage 316 as the prediction for the entire document. However, if the vertex with the trigger flag is not detected in the elements of interest (because the end of the document has not yet been reached), then processing continues, over and over, adding more content to the machine learning predictor 518a, until the trigger has been reached.

In parallel, an engine 508 may build a second pipeline 510 automatically based on a dependency graph (not shown). In the second pipeline 510, a reader 510a may read a text stream and then may split the text stream into the sentences and the tokens to generate a stream of content blocks (lexical items). The content stream may pass from the reader 510a to a processor A 510b. The processor A 510b may add, split or transform the tokens. From the processor A 510b, the content stream may then be passed on to a recognizer A 510c, which may further tag the content using dictionaries, patterns, or machine learning natural language processing methods as needed. From the recognizer A 510c, the content stream may be passed to a classifier B 510d. The classifier B 510d may be a sentence classifier which is shown in detail as a sentence classifier 512. The sentence classifier 512 may extract elements of interest and may create a copy for internal ingestion in a machine learning predictor 512a.

In the sentence classifier 512, if a vertex with trigger flag indicating the end of the sentence is detected in the extracted elements of interest, then, a final classification prediction for the sentence may be requested from the machine learning predictor 512a. Note that the machine learning predictor 512a for the sentence classifier 512 also fetches, as input, the document classification from the document classifier 518, previously computed, from the scope storage 316. This full document classification is now available to provide the context/type of the whole document, which can be used by the machine learning predictor 512a to improve the performance and accuracy of the sentence classifier.

FIG. 5C illustrates a pipeline diagram for a larger classification path to a smaller classification path, according to an example embodiment of the present disclosure.

In an example embodiment, a pipeline 522a may be built automatically on the basis of the dependency graph (or tree). A stream of text may be received at a split document module 524. The split document module 524 may flag a beginning of a document with a start document flag and may flag an end of the document with an end document flag. The beginning and the end of the document may be propagated automatically to the NLP processors which splits documents into lexical items of a smaller scope, such as a split tokens module 526.

The split document module 524 may flag a beginning of a document with a start document flag and flag an end of the document with an end document flag. This may be propagated, automatically, to lexical items of smaller scope in a split tokens module 526, which may then split each document into the tokens, flagging a first token as a first token of its associated document and a last token within the document as a last token in the document. A document model 528 may be initialized whenever it may receive a token with a start document flag. The document model 528 may process each token as it comes. The document model 528 may complete processing for a document when it may receive a token with the end document flag. The document model 528 may run a final prediction and may store the final prediction output in the scope storage 316 that may be an independent data structure that persists outside of the pipeline 522a.

In an example embodiment, a pipeline 522b may be built automatically on the basis of the dependency graph (or tree). A stream of text (in the example, the same document as used for document classification by pipeline 522a) may be received at a split sentences module 530. The split sentences module 530 may flag a beginning of a sentence with a start sentence flag and may flag an end of the sentence with the end sentence flag.

This may be propagated, automatically, to lexical items of smaller scope in a split tokens module 532, which may then split each sentence into the tokens, flagging a first token as a first token of its associated sentence and a last token within the sentence as a last token in the sentence. A sentence classification model 534 (also referred to hereinafter as a sentence model 534) may be initialized whenever it may receive a token with a start sentence flag. The sentence model 534 may process each token as it comes (e.g., by feeding it to a neural network or by accumulating a "bag of words" structure which may be stored in memory—for example in the machine learning predictor 314a from FIG. 3B or 3C). The sentence model 534 may also take as input the full document classification stored in scope storage 316 from the prior execution of pipeline 522a. The sentence model 534 may complete processing for a sentence when it may receive a token with the end sentence flag. The sentence model 534 may run a final prediction and may store the final prediction output in the scope storage 316 that may be an independent data structure that persists outside of the pipeline 522b.

Figure 5B:
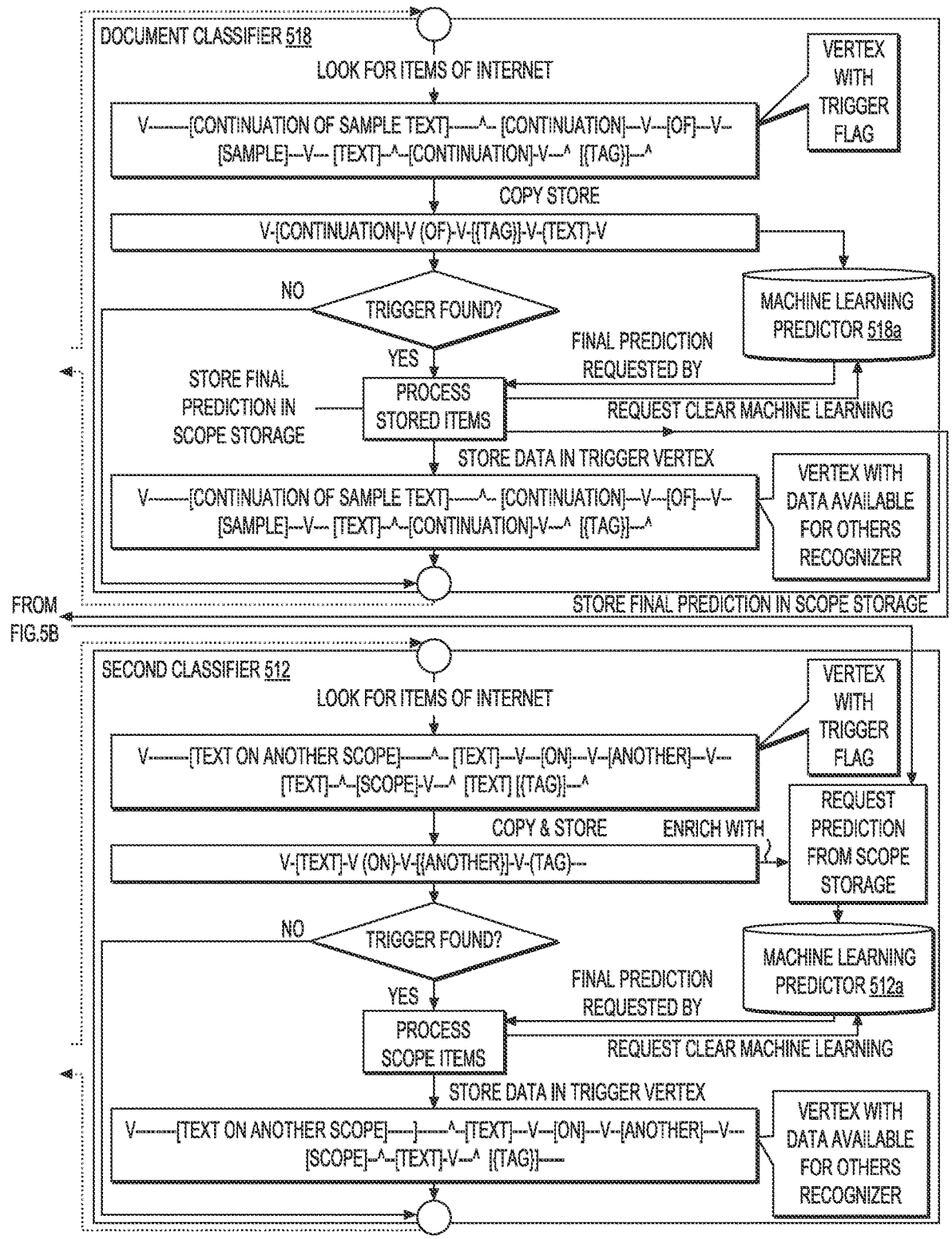
Figure 6A:
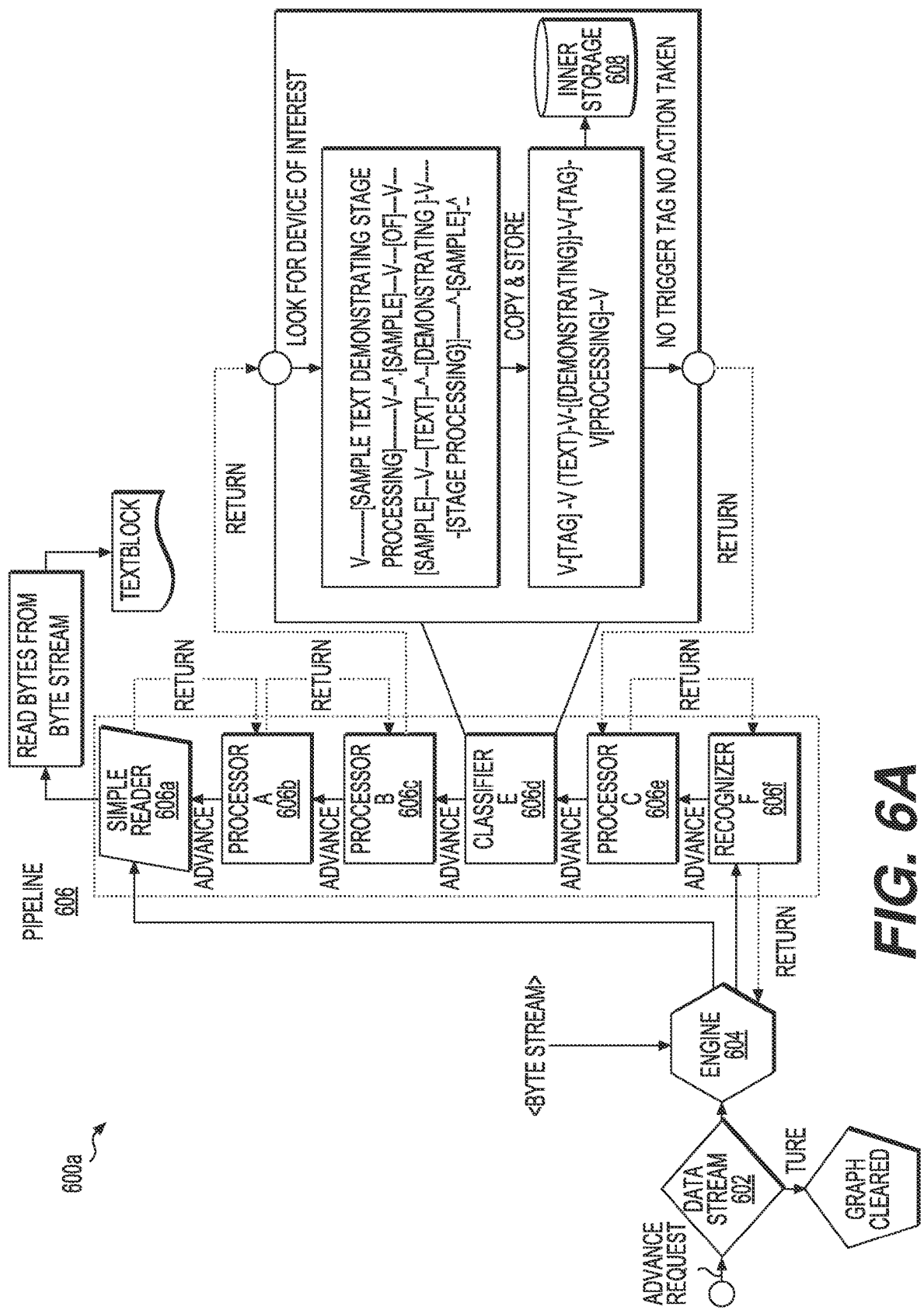
FIGS. 6A and 6B illustrate embodiments of the system, according to an example embodiment of the present disclosure.
Figure 6B:
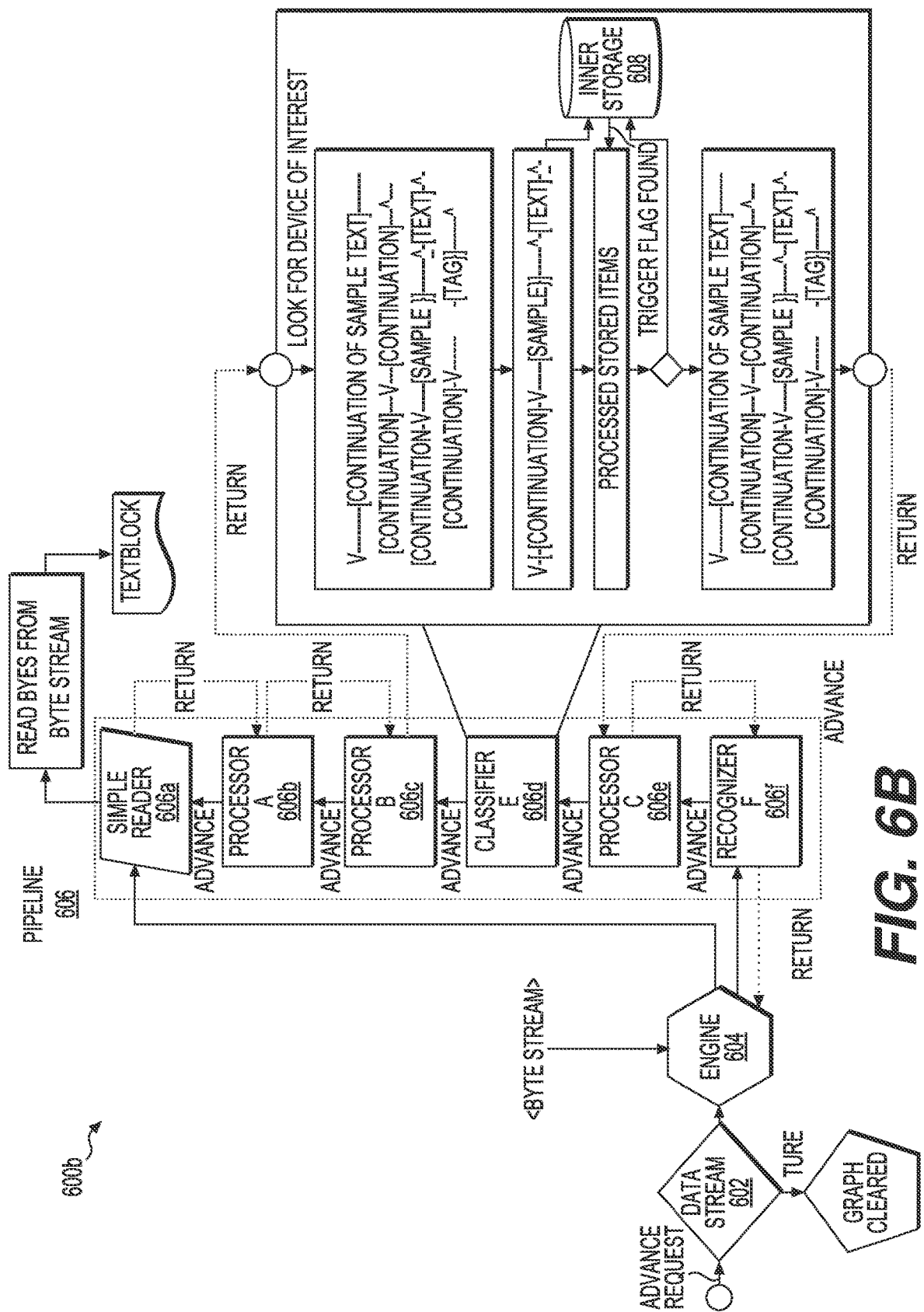

In an example embodiment, the sentence model 534 may release memory space required to process the sentence model 534 after the final prediction for each sentence it processes. The scope storage 316 may hold the output of all of the models for all scopes and becomes the final output from the system 102 to be used for the down-stream processing, FIGS. 6A and 6B illustrate embodiments of the system 102, according to an example of the present disclosure, FIGS. 6A and 6B illustrate the simpler case of a single classifier (as compared to earlier figures, FIGS. 3 and 4, and 5, which illustrate multiple classifiers of different scopes). As illustrated in the FIGS. 6A and 6B, an input data stream 602 may be accepted by an engine 604. The engine 604 may build a pipeline 606 automatically based on a dependency graph (not shown). In the pipeline 606, a Simple reader 606a reads the input data stream 602 and splits the input data stream 602 into text blocks that are processed by a processor A 606b, a processor B 606c, a classifier E 606d, a processor C 606e, and a recognizer F 606f in sequence. The processor A 606b may be configured for sentence splitting, the Processor B 606c may be configured for tokenization, and the classifier E 606d may be configured to classify on the basis of a string of tokens obtained from the input data stream 602.

In an example embodiment, the recognizer F 606f may be a number recognizer or bank account recognizer or any recognizer. The processor A 606b, the processor B 606c, and the processor C 606e may perform a split or transformation operation on the input data stream 602 or may tag the data in some way using the NLP processors or machine learning algorithms and then pass the split, transformed or tagged content to the classifier E 606d as input to the classifier. The classifier E 606d may identify further elements and then may extract those elements of interest to create a copy and then may store it, transform it, or input it to a machine learning model the intermediate results of which could be stored in an inner storage 608. The inner storage 608 works in conjunction with the classifier E 606d to hold intermediate content required for the classification of a block of content. In this way, the classifier 606d may not require all content all at once, but instead can process a stream of content that continually updates the inner storage 608 as required by the machine learning model (shown later in FIG. 6B). As an example, the inner storage could store a list of all unique words in a document, with the count of each word (commonly known as a "bag of words"), This bag of words could then be passed to a pre-trained machine learning algorithm to classify the document.

Further, for the input data stream 602, the classifier E 606d can choose what tokens, tags, sentences, and other content produced by the processor A 606b and the processor B 606c it finds to be important. This can include making choices about which tags to include in the inner storage/ passed to the machine learning predictor, based on the confidence of these tags, possibly in comparison to the confidence level of other, possibly ambiguous or conflicting tags, produced by processors earlier in the pipeline 606. The classifier E 606d may act as a classifier and may be a sentence classifier or a paragraph classifier. A trigger flag detector shown in FIG. 6B may correlate to a start sentence flag or an end sentence flag and the inner storage 608 is a memory that the classifier may need to classify the input data stream 602.

FIG. 6B depicts how, when the trigger flag indicating the end of a logical block of content, for example, the end of a sentence, paragraph, section, or document, is found, then the content passed to the inner storage is "complete", and the machine learning predictor can now make its final prediction as to the classification of the specified content. This classification can then be tagged to the content and used by later stages in the pipeline, for example, the recognizer F 606F, if it finds this information to be helpful to perform whatever NLP recognition it requires.

Once the entire pipeline 606 has finished the process in the recognizer F 606f, the process may return to the engine 604. If the processing of the input data stream 602 is not completed yet, then more content may be provided to the simple reader 606A which then pushes that content down the pipeline until all of the content has been processed.

Figure 7:
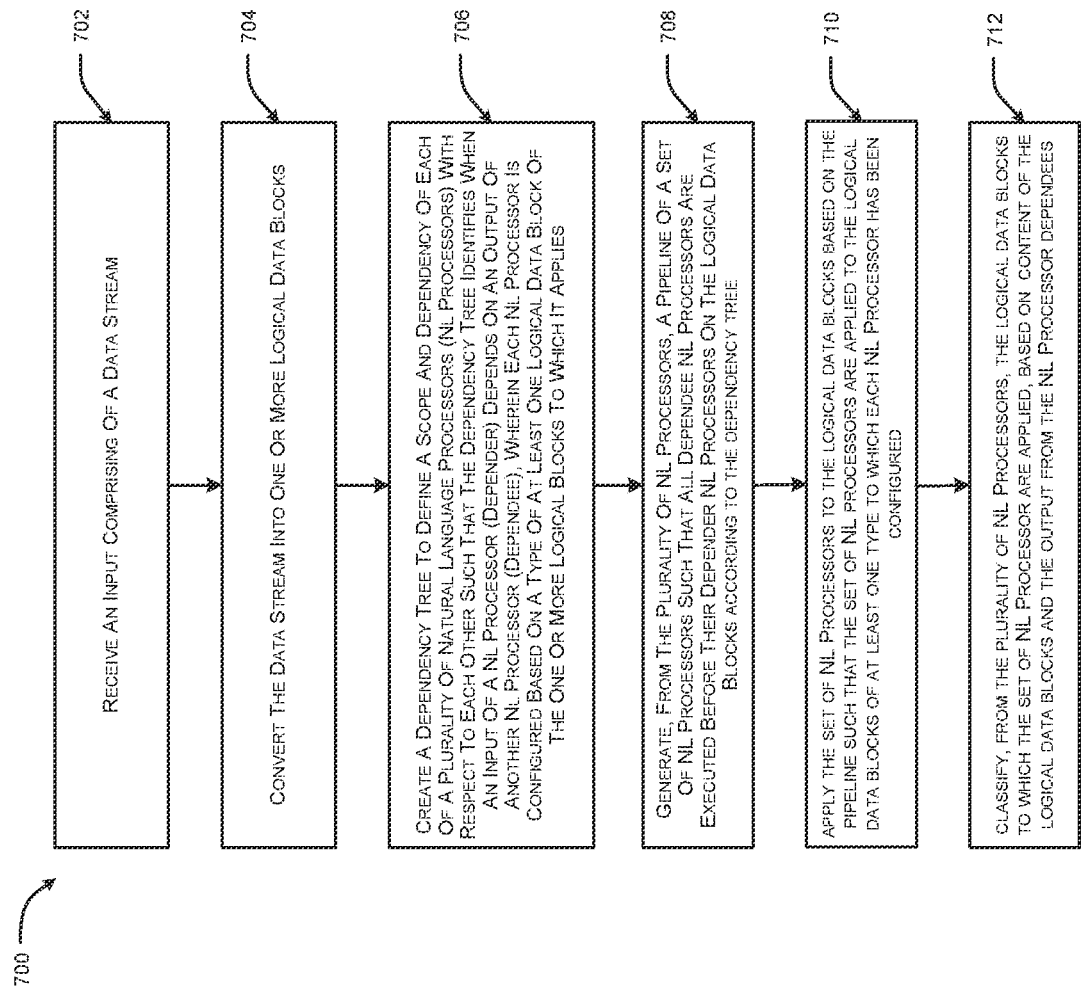
FIG. 7 illustrates a flow chart depicting a method for processing an input data stream to generate a dependency tree, according to an example embodiment of the present disclosure.

FIG. 7 illustrates a flow chart depicting a method 700 for processing an input data stream to generate a dependency tree, according to an example of the present disclosure.

At block 702, the method 700 may include receiving, by a processor, an input comprising of a data stream. In an embodiment, the input may be an original document content, and if the logical data block holds metadata associated with the original document content, then the input may include the metadata. The metadata may indicate a location of the one or more logical data blocks in the original document content. The metadata may also indicate a flag that is indicative of start or end of any or a combination of the logical data blocks.

Further, the input may be references to shared metadata for the logical data blocks. In an example, a user may provide the input to the data reader 104 through input devices such as a keyboard, a microphone, and a pointing device, for example, a mouse or a touchpad. The input may be indicative of a data stream. In an example, the data stream comprises raw text indicative of a natural language.

At block 704, the method 700 may include converting, by the processor, the data stream into one or more logical data blocks, Upon receiving the data stream, the data reader 104 may read data from the data stream and convert the data stream into one or more logical data blocks. The logical data blocks may represent logical divisions of content from the data stream. The logical data blocks may be indicative of whole documents, document sections, document paragraphs, or document sentences.

At block 706, the method 700 may include creating, by the processor, a dependency tree to define a scope and dependency of each of a plurality of the NL processors with respect to each other such that the dependency tree identifies when an input of a NL Processor (depender) depends on an output of another NL Processor (dependee). Each NL Processor may be configured based on a type of at least one logical data block of the one or more logical blocks to which it applies.

At block 708, the method 700 may include generating, by the processor, a pipeline of a set of NL Processors, from the plurality of NL Processors, in such a manner that all dependee NL Processors are executed before their depender NL Processors on the logical data blocks.

At block 710, the method 700 may include applying, by the processor, the set of NL Processors to the logical data blocks based on the pipeline such that the set of NL processors are applied to the logical data blocks of at least one type to which each NL Processor has been configured.

At block 712, the method 700 may include classifying, by the processor, from the plurality of NL Processors, the logical data blocks to which the set of NL Processor are applied, based on content of the logical data blocks and the output from the NL Processor dependees.

Figure 8:
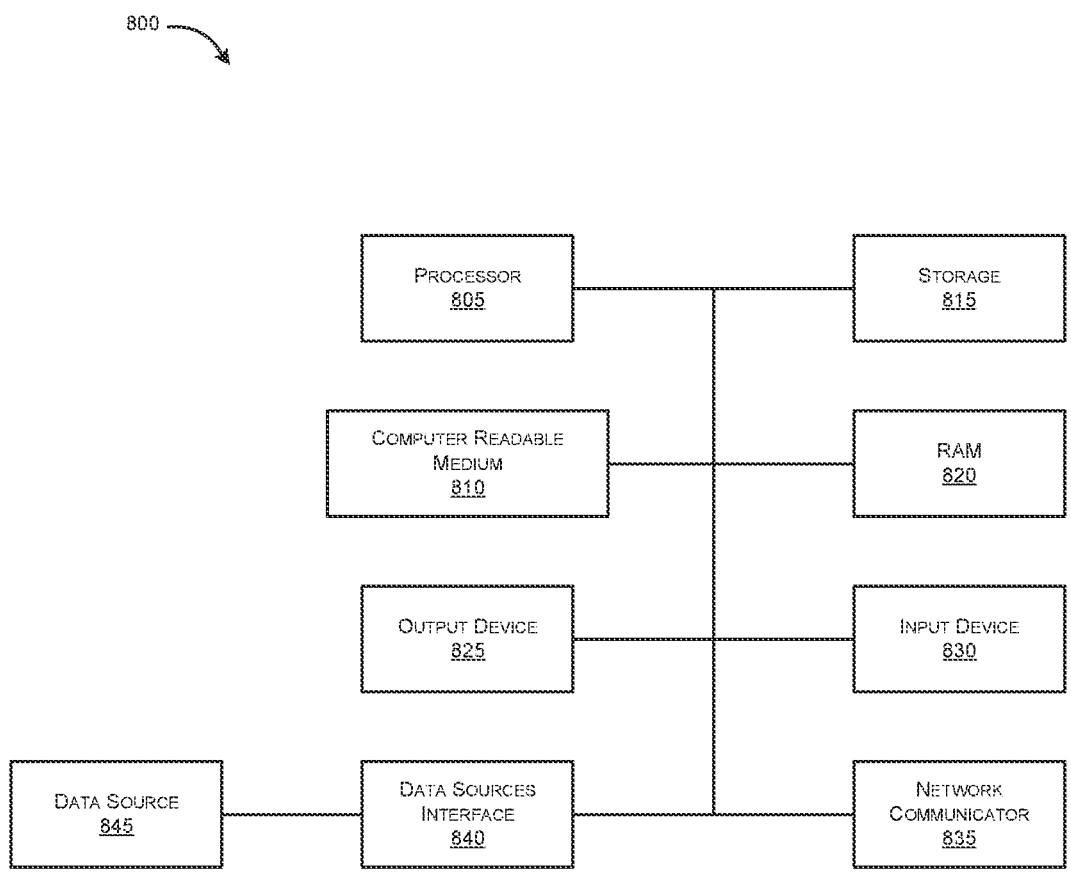
FIG. 8 illustrates a hardware platform for implementing a natural language processing system, according to an example embodiment of the present disclosure.

FIG. 8 illustrates a hardware platform 800 for implementation of the disclosed system, according to an example embodiment of the present disclosure. For the sake of brevity, the construction and operational features of the system 102 which are explained in detail above are not explained in detail herein. Particularly, computing machines such as but not limited to internal/external server clusters, quantum computers, desktops, laptops, smartphones, tablets, and wearables which may be used to execute the system 102 or may include the structure of the hardware platform 800. As illustrated, the hardware platform 800 may include additional components not shown, and some of the components described may be removed and/or modified. For example, a computer system with multiple GPUs may be located on external-cloud platforms including Amazon Web Services, or internal corporate cloud computing dusters, or organizational computing resources, etc.

The hardware platform 800 may be a computer system such as the system 102 that may be used with the embodiments described herein. The computer system may represent a computational platform that includes components that may be in a server or another computer system. The computer system may execute, by the processor 805 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 805 that executes software instructions or code stored on a non-transitory computer-readable storage medium 810 to perform methods of the present disclosure. The software code includes, for example, instructions to gather data and documents and analyze documents. In an example, the data reader 104, the dependency tree generator 106, and the pipeline-based execution engine 108 may be software codes or components performing these steps.

The instructions on the computer-readable storage medium 810 are read and stored in storage 815 or random access memory (RAM). The storage 815 may provide a space for keeping static data where at least some instructions could be stored for later execution. The stored instructions may be further compiled to generate other representations of the instructions and dynamically stored in the RAM such as RAM 820. The processor 805 may read instructions from the RAM 820 and perform actions as instructed.

The computer system may further include the output device 825 to provide at least some of the results of the execution as output including, but not limited to, visual information to users, such as external agents. The output device 825 may include a display on computing devices and virtual reality glasses. For example, the display may be a mobile phone screen or a laptop screen. GUIs and/or text may be presented as an output on the display screen. The computer system may further include an input device 830 to provide a user or another device with mechanisms for entering data and/or otherwise interacting with the computer system. The input device 830 may include, for example, a keyboard, a keypad, a mouse, or a touchscreen. Each of these output devices 825 and input device 830 may be joined by one or more additional peripherals. For example, the output device 825 may be used to display the results such as bot responses by the executable chatbot.

A network communicator 835 may be provided to connect the computer system to a network and in turn to other devices connected to the network including other clients, servers, data stores, and interfaces, for example. A network communicator 835 may include, for example, a network adapter such as a LAN adapter or a wireless adapter. The computer system may include a data sources interface 840 to access the data source 845. The data source 845 may be an information resource. As an example, a database of exceptions and rules may be provided as the data source 845. Moreover, knowledge repositories and curated data may be other examples of the data source 845.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a processor;
a data reader coupled to the processor to:
receive an input comprising a data stream;
convert the data stream into one or more logical data blocks;
a dependency tree generator, coupled to the processor to:
create a dependency tree to define a scope and dependency of each of a plurality of natural language processors (NL Processors) with respect to each other such that the dependency tree identifies when an input of a NL Processor (depender) depends on an output of another NL Processor (dependee), wherein each NL Processor is configured based on a type of at least one logical data block of the one or more logical blocks to which it applies;
a pipeline-based execution engine, coupled to the processor to:
generate, from the plurality of NL Processors, a pipeline of a set of NL Processors such that all dependee NL Processors are executed before their depender NL Processors on the logical data blocks according to the dependency tree; and
apply the set of NL Processors to the logical data blocks based on the pipeline such that the set of NL processors are applied to the logical data blocks of at least one type to which each NL Processor has been configured; and
apply the set of NL Processors to classify the logical data blocks to which the set of NL Processor are applied, based on content of the logical data blocks and the output from the NL Processor dependees.

2. The system of claim 1, wherein each logical data block represents logical divisions of content from the data stream, and wherein the logical data block comprises at least one of a whole document, a document section, a document paragraph, or a document sentence.

3. The system of claim 1, wherein the input is original document content, and wherein the at least one logical data block comprises metadata associated with the original document content, the metadata being indicative of at least one of location of the one or more logical data blocks in the original document content, and flags indicative of a start or an end of any or a combination of the logical data blocks, and references to shared metadata for the logical data blocks.

4. The system of claim 3, wherein the one or more logical data blocks are sent to the set of NL Processors in an order in which the logical data blocks occurred in the original document content.

5. The system of claim 4, wherein the one or more logical data blocks sent to the NL processors are flagged to indicate when a smaller granularity data block represents a start or a finish (or both) of a larger granularity data block which is used by the set of NL processors to determine a start of content and an end of content which is being classified.

6. The system of claim 3, wherein the NL processors perform processing of at least one of the original document content and the metadata to create new metadata.

7. The system of claim 1, wherein the dependency tree is an acyclic directed graph, and wherein the dependency tree is hierarchical such that a first depender NL processor at a higher granularity depends upon classifications provided by a lower granularity second dependee NL processor to classify the higher-granularity logical data blocks.

8. The system of claim 1, wherein the NL processor is any of a classifier, a processor, or a recognizer.

9. The system of claim 1, wherein the plurality of NL processors comprises at least one of document level NL processors, paragraph level NL processors, page level NL processors, section level NL processors, token level NL processors, character level NL processors, and sentence level NL processors, wherein a third NL processor depends on two or more of the plurality of NL processors.

10. The system of claim 1, wherein a scope-level storage stores an aggregation of classification outputs from the NL processor where each classification output indicates a respective granularity level of the logical data block being classified.

11. The system of claim 10, wherein the scope-level storage comprises a key-value map, wherein a key of the key-value map is composed based on a combination of start-end character positions of a logical data block, and wherein a value represented by the key is obtained from a given NL Processor classifier which produces a classification of the given logical data block which is then accessed by one or more other NL Processors for further classification.

12. The system of claim 11, wherein when two or more iterations are performed for classification of an original document content, and wherein the pipeline-based execution engine generates a pipeline corresponding to each of the two or more iterations, and wherein the scope-level storage is configured to store output from an iteration and make it available to be used as input to a next iteration such that the output of classification of a larder granularity logical data block can be used to classify content for smaller granularity logical data blocks.

13. The system of claim 12, wherein the processor inspects the dependency tree to evaluate the number of iterations to be processed for the original document content, and optimizes the pipelines to minimize the number of iterations by combining operations together into a smaller number of pipelines.

14. A method comprising:
receiving, by a processor, an input comprising a data stream;
converting, by the processor, the data stream into one or more logical data blocks;
creating, by the processor, a dependency tree to define a scope and dependency of each of a plurality of natural language processors (NL Processors) with respect to each other such that the dependency tree identifies when an input of a NL Processor (depender) depends on an output of another NL Processor (dependee), wherein each NL Processor is configured based on a type of at least one logical data block of the one or more logical blocks to which it applies;
generating, by the processor, from the plurality of NL Processors, a pipeline of a set of NL Processors such that all dependee NL Processors are executed before their depender NL Processors on the logical data blocks according to the dependency tree; and
applying, by the processor, the set of NL Processors to the logical data blocks based on the pipeline such that the set of NL processors are applied to the logical data blocks of at least one type to which each NL Processor has been configured; and
classifying, by the processor, from the plurality of NL Processors, the logical data blocks to which the set of NL Processor are applied, based on content of the logical data blocks and the output from the NL Processor dependees.

15. The method of claim 14, wherein each logical data block represents logical divisions of content from the data stream, and wherein the logical data block comprises of at least one of a whole document, a document section, a document paragraph, or a document sentence.

16. The method of claim 14, wherein the input is original document content, and wherein the at least one logical data block comprises metadata associated with the original document content, the metadata being indicative of at least one of location of the one or more logical data blocks in the original document content, and flags indicative of a start or an end of any or a combination of the logical data blocks, and references to shared metadata for the logical data blocks.

17. The method of claim 16, wherein the one or more logical data blocks are sent to the set of NL Processors in an order in which the logical data blocks occurred in the original document content.

18. The method of claim 17, wherein the one or more logical data blocks sent to the NL processors are flagged to indicate when a smaller granularity data block represents a start or a finish (or both) of a larger granularity data block which is used by the set of NL processors to determine a start of content and an end of content which is being classified.

19. The method of claim 14, wherein the dependency tree is hierarchical such that a first depender NL processor at a higher granularity depends upon classifications provided by a lower granularity second dependee NL processor to classify the higher-granularity logical data blocks.

20. A non-transitory computer-readable medium including machine-readable instructions that are executable by a processor to:
receive an input comprising a data stream;
convert the data stream into one or more logical data blocks;
create a dependency tree to define a scope and dependency of each of a plurality of natural language processors (NL Processors) with respect to each other such that the dependency tree identifies when an input of a NL Processor (depender) depends on an output of another NL Processor (dependee), wherein each NL Processor is configured based on a type of at least one logical data block of the one or more logical blocks to which it applies;
generate, from the plurality of NL Processors, a pipeline of a set of NL Processors such that all dependee NL Processors are executed before their depender NL Processors on the logical data blocks, according to the dependency tree; and
apply the set of NL Processors to the logical data blocks based on the pipeline such that the set of NL processors are applied to the logical data blocks of at least one type to which each NL Processor has been configured; and
apply the set of NL Processors to classify the logical data blocks to which the set of NL Processor are applied, based on content of the logical data blocks and the output from the NL Processor dependees.

* * * * *